(12) United States Patent
Chen

(10) Patent No.: US 7,500,768 B2
(45) Date of Patent: Mar. 10, 2009

(54) MOTORIZED CONTROLS FOR A HEADLIGHT OF A VEHICLE

(76) Inventor: Jack Chen, 300 Windsor Dr., Oak Brook, IL (US) 60523

( * ) Notice: Subject to any disclaimer, the term of this patent is extended or adjusted under 35 U.S.C. 154(b) by 176 days.

(21) Appl. No.: 11/296,741

(22) Filed: Dec. 7, 2005

(65) Prior Publication Data

US 2007/0127254 A1    Jun. 7, 2007

(51) Int. Cl.
*G01B 5/24* (2006.01)
*B60Q 1/26* (2006.01)

(52) U.S. Cl. ............ 362/460; 362/469; 362/467; 362/507; 362/529; 362/530

(58) Field of Classification Search .......... 362/460, 362/464, 465, 466, 469, 467, 507, 529, 530
See application file for complete search history.

(56) References Cited

U.S. PATENT DOCUMENTS

| | | | | |
|---|---|---|---|---|
| 5,908,239 A | * | 6/1999 | Sugimoto | 362/528 |
| 6,428,196 B1 | * | 8/2002 | Deguchi et al. | 362/515 |
| 2003/0223242 A1 | * | 12/2003 | Deguchi | 362/463 |

* cited by examiner

*Primary Examiner*—Jacob Y Choi
(74) *Attorney, Agent, or Firm*—Robert L. Marsh

(57) ABSTRACT

A vehicle headlight has a motor operated adjustable mounting for adjusting the beam of light in a plane. The adjustment device includes an ear on the headlight with an axially extendable arm, the extension of which is driven by an electric motor. Rotation of the motor causes motorized adjustment of the beam. The motor is slideably mounted in a retainer for movement parallel to the extendable arm. A manually adjustable screw adjusts the position of the motor along the slide to permit manual alignment of the headlight beam.

8 Claims, 8 Drawing Sheets

MOTORIZED CONTROLS FOR A HEADLIGHT OF A VEHICLE

The present invention relates to the adjusting of the aim of the headlights of a vehicle and in particular to a motor assembly for motorized adjusting of the aim of a headlight beam during the operation of the vehicle to compensate for changes in the conditions of the road and the loading of the vehicle.

BACKGROUND OF THE INVENTION

To operate properly, the headlights of an automobile must be adjusted with respect to the vehicle body so as to be directed toward the road ahead. Presently, it is the practice to adjust the headlight orientation at the time the headlight is installed, with no further adjustment undertaken unless the original adjustment is either lost, or determined by the vehicle user to be deficient.

With the advent of miniaturized electric motors and the computer chip, it has become possible to motorize the aiming of a headlight of an automobile so that the aim of the beam is continuously adjusted as the vehicle is being driven. For example, a heavy load in the trunk of the vehicle will cause the rear springs of the vehicle to become compressed, such that the headlight beams will become elevated and directed into the eyes of oncoming drivers. By providing sensors in the shock absorbers and motorized controls for aiming the headlight beams, the beams can be adjusted downwardly to compensate for the changes in the vehicle orientation. Similarly, motorized controls for the headlights can turn one or both of the headlight beams to one side when sensors in the steering mechanism of the vehicle determine that the vehicle is undertaking a turn. It is anticipated that in the not too distant future, government safety regulations will require vehicle manufacturers to provide motorized controls for headlights.

The motorizing of controls for headlights will not eliminate the need, however, for adjusting the aim of the headlights with respect to the vehicle body when the vehicle is in a steady state condition. For example, if the headlights of a vehicle are not aimed at the proper elevation while the vehicle is in the steady state condition, a microprocessor responding to detectors in the shock absorbers will be unable to properly adjust the beam in response to a load in the trunk. Similarly, motorized controls for the horizontal adjustment of the headlights as the vehicle undertakes a turn cannot be properly undertaken where the headlight beam is directed off road while the vehicle is traveling in a straight line. The motorizing of the controls of a headlight beam require that the headlight position be manually adjustable with respect to the vehicle frame so as to be properly aimed in the steady state condition, where the steady state condition is defined as the vehicle being substantially unloaded, resting on a level surface with the beams directed to illuminate the roadway immediately ahead.

It has become customary to mount the body of a headlight to a vehicle frame by providing three mounting points positioned around the circumference of the headlight body. To manually adjust the aim of a headlight beam, adjustment screws are provided at least two of the three mounting locations of a headlight body. Where only two of the mounting locations are adjustable, the third mounting location typically consists of a ball joint or the like such that one of the two adjustable locations will change the vertical elevation of the beam and the second of the adjustable locations will change the horizontal orientation of the beam.

Prior efforts to motorize the controls for aiming a headlight require that the headlight body be mounted in a first frame pivotable about a first axis, for example a horizontal axis, and the first frame mounted in a second frame pivotable about a second axis, for example a vertical axis. A first motor then adjusts the first frame with respect to the second frame and a second motor adjusts the second frame with respect to the vehicle body. Such efforts not only require the precision manufacture and assembly of several moving parts but also require a considerable enlargement of the space allocation required for the mounting of the headlight. It would be desirable to provide a more efficient mounting of a motorized headlight so as to reduce the amount of space needed to undertake motorized controls and still provide for the manual adjustment of a beam under steady state conditions.

SUMMARY OF THE INVENTION

Briefly, the present invention is embodied in an assembly for motorizing the positioning of a headlight with respect to a vehicle body where the headlight is mounted on a vehicle in three locations, one of which is a pivot mounting. Each of the second and third mounting locations has a motorized assembly that extends or retracts an elongate member, such as a threaded shank, the outer end of which is attached to the headlight. Axial movement of the elongate member connected to the second mounting position changes the orientation of the headlight in a first plane and axial movement of the elongate member at the third mounting location changes the orientation of the beam of the headlight in a second plane.

Each of the motorized assemblies includes a retainer attached to the vehicle body and linearly moveable within the retainer in a direction towards and away from the headlight is a housing that contains a drive assembly for extending and retracting the elongate member. In the preferred embodiment, the elongate member is a threaded shaft that threadedly engages threads within a central opening of a rotatable gear. The gear is locked against axial movement with respect to the housing such that rotation of the gear causes axial movement of the threaded shaft.

Also in the preferred embodiment, a magnet is positioned on the end of the elongate member that extends into the housing and at least one Hall effect detector is positioned opposite the path of the elongate member as it moves in the housing. One Hall effect detector that is positioned opposite the magnet on the elongate member when the elongate member is midway between its fully extended position and its fully retracted position provides a point of reference to a microprocessor enabling it to control the operation of the motor to extend and retract the elongate member.

BRIEF DESCRIPTION OF THE DRAWINGS

A better understanding of the invention will be had after a reading of the following detailed description taken in conjunction with the drawings wherein.

DETAILED DESCRIPTION OF A PREFERRED EMBODIMENT

Figure 1:
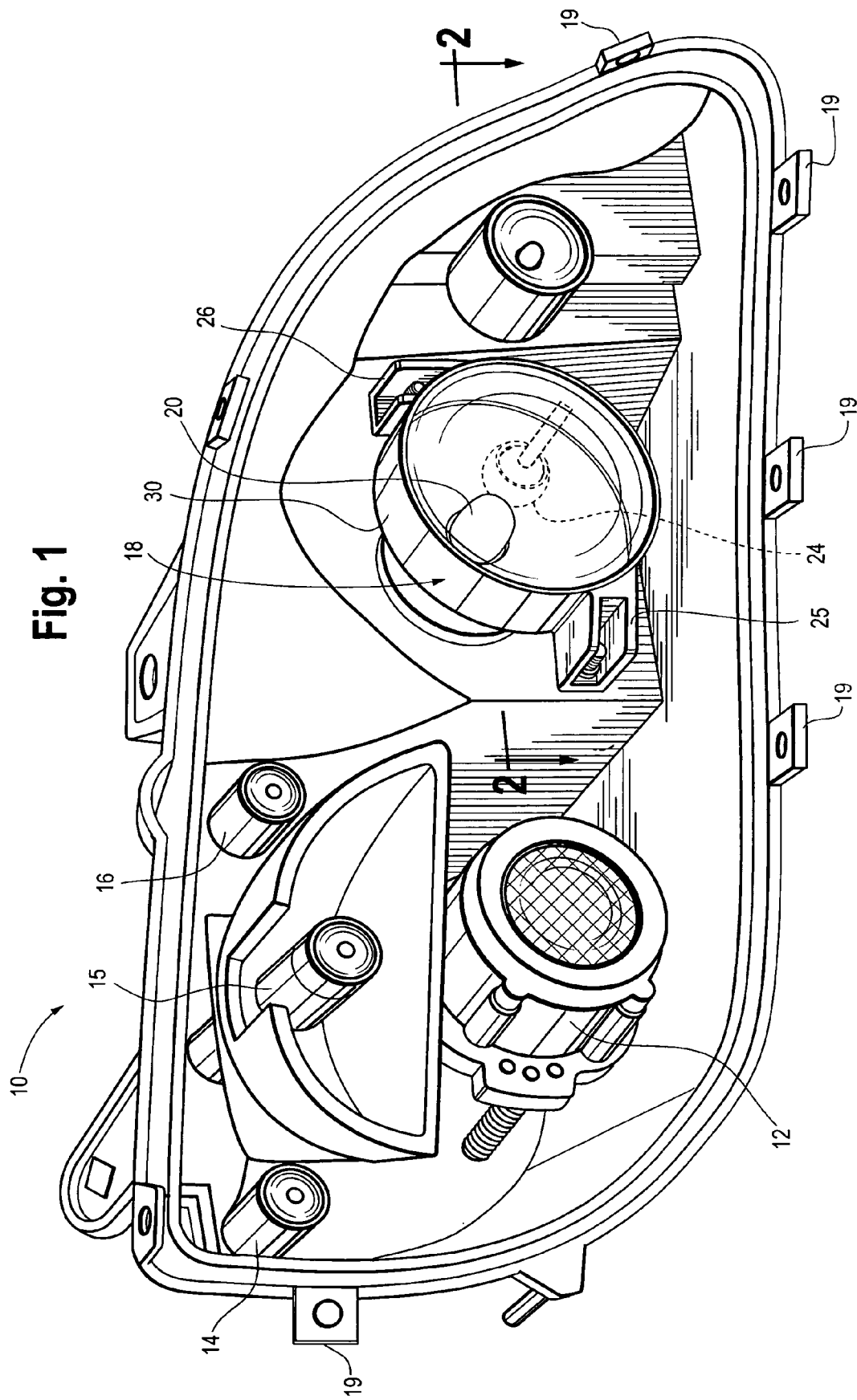
FIG. 1 is an isometric view of a headlight assembly having motorized drive assembly in accordance with the invention.
Figure 2:
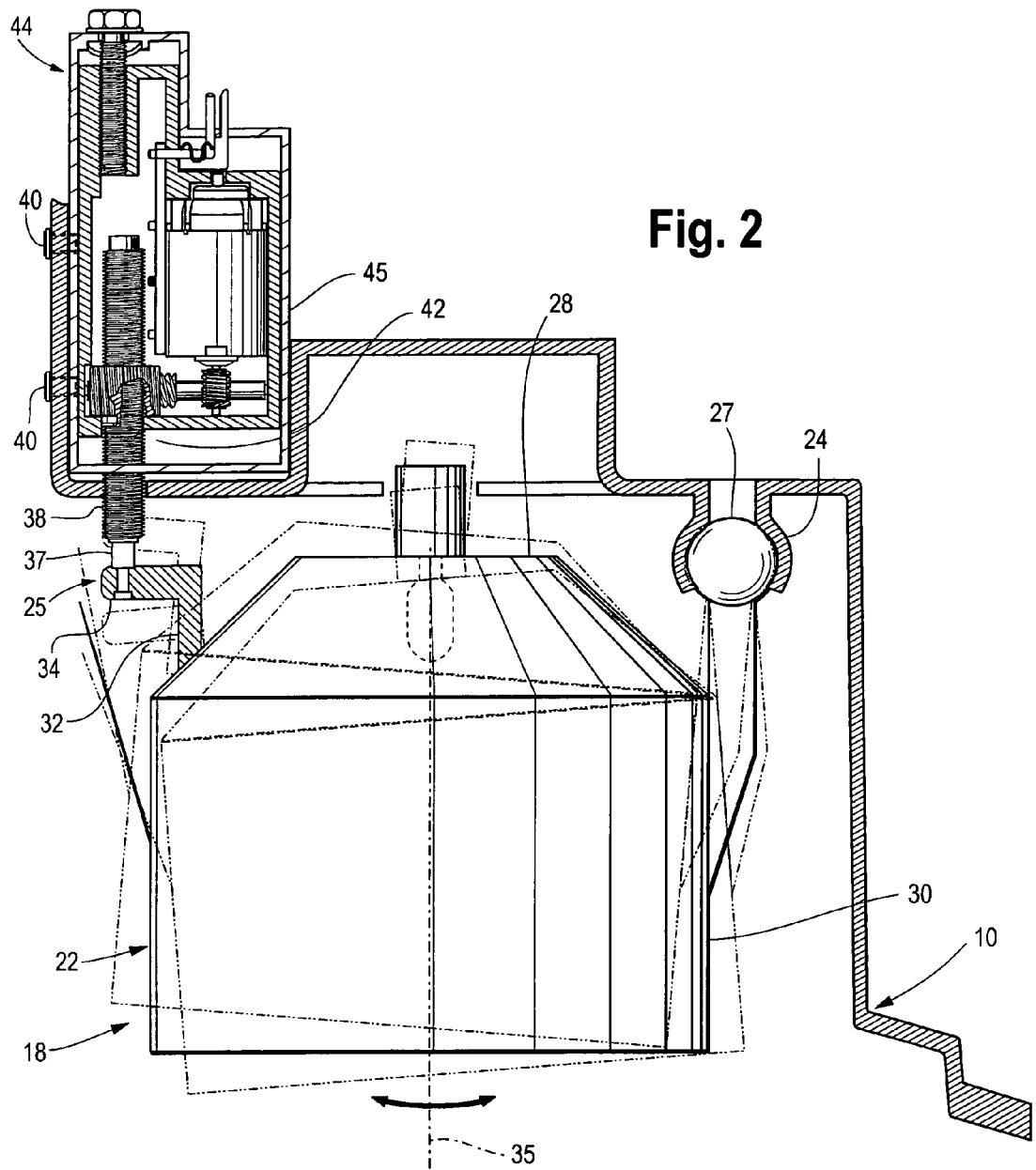
FIG. 2 is a cross-sectional view of a first embodiment of one of the motorized drive assemblies for controlling the aim of the headlight shown in FIG. 1.

Referring to FIGS. 1 and 2, a vehicle has a body, not shown, portions of which are made from metal and other portions are made from other materials such as plastic and the like, and mounted to the vehicle body on opposite sides of the forward end of the vehicle are a pair of headlight assemblies, one of which 10 is depicted. The headlight assembly 10 includes a base 11 shaped to fit into an opening in the forward end of the body of a vehicle and mounted in the base 11 are a number of lighting elements including a turn signal 12, parking lights 14, 15, 16 and a headlight 18. The headlight 18 typically includes a low beam which, when properly aimed, is directed generally downwardly so as to illuminate the pavement immediately before the vehicle without shining in the eyes of drivers of oncoming traffic. The headlight 18 may also include a high beam orientation intended to provide maximum illumination of the roadway ahead. A number of attachment tabs 19 are positioned around the headlight assembly 10 for attaching the assembly 10 to the body of a vehicle. Once the assembly 10 is secured to the body of the vehicle, the mountings that retain the headlight 18 to the assembly 10 also mount the headlight 10 with respect to the vehicle body. For the purposes of this discussion, the assembly base 11 shall be considered parts of the body of the vehicle body.

The headlight 18 includes a centrally located lighting element 20, and surrounding the light element 20 is a generally cylindrical housing 22, the inner surface of which is highly reflective and configured so as to direct light from the light element 20 in a forwardly direction. Positioned around the outer circumference of the headlight housing 22 are three mounting positions 24, 25, 26. The second and third mounting positions 25, 26 are both spaced from the first mounting position 24 and preferably, a line passing through the first and second mounting positions 24, 25 will be generally perpendicular to a line passing through the first and third mounting positions 24, 26. In the embodiment depicted, a line through mountings 24 and 25 will be generally horizontal and a line through mountings 24 and 26 will be generally vertical. The first mounting position 24 is a ball joint 27. Accordingly, a longitudinal adjustment of the second position 25 will change the aim of the light beam from the headlight 18 within a generally horizontal plane and the a longitudinal adjustment of the third position 26 will change the direction of the light beam from the headlight 18 in a generally vertical plane.

Figure 3:
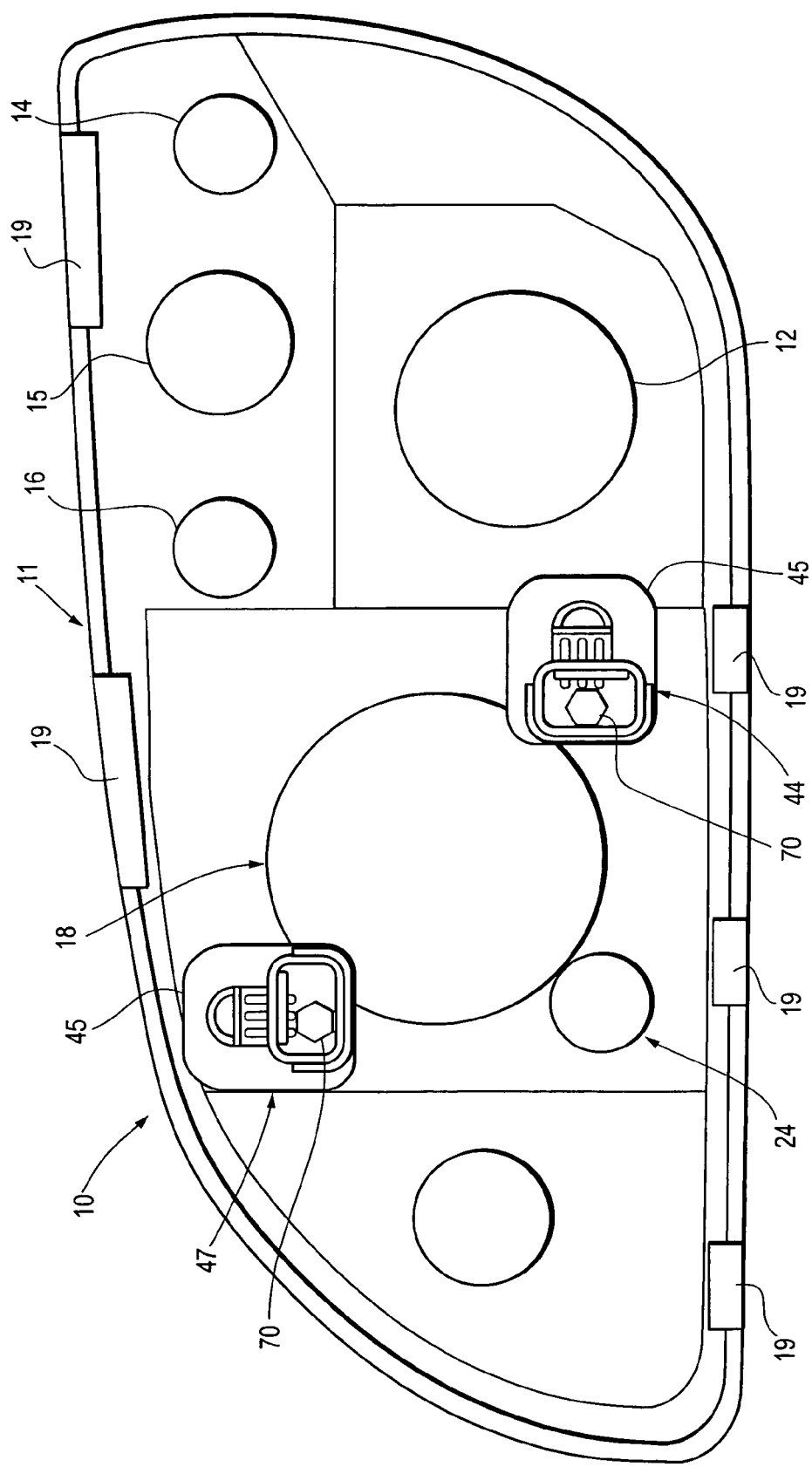
FIG. 3 is a rear view of the headlight assembly shown in FIG. 1.

Referring to FIGS. 1, 2 and 3, the headlight housing 22 is shown as consisting of a single part that includes a central dome portion 28 surrounded by a generally cylindrical outer surface 30, and suitably spaced around the outer surface 30 are the respective mounting positions 24, 25, 26. It should be appreciated that the headlight housing may be removably mounted in a retainer frame, as depicted in FIGS. 9, 10, 11, and 12, with the mounting positions 24', 25', 26' arranged around the frame. For the purposes of this discussion, however, the invention will be described in detail beginning with the depiction in FIGS. 1, 2, and 3.

As depicted, the second mounting position 25 includes a bracket 32 having a mounting ear 34 oriented generally perpendicular to the axis 35 of the cylindrical outer surface 30 of the headlight 18, and non-rotatably connected by a flexible connector element 37 to the mounting surface 34 is a screw 38. Axial movement of the screw 38 in one direction will adjust the beam of the headlight 18 horizontally in one direction and axial movement of the screw 38 in the opposite direction will adjust the beam horizontally in the opposite direction.

Similarly, the third mounting position 26 includes a second bracket having a mounting ear, not shown, oriented generally perpendicular to the axis 35 of the headlight 18 and non-rotatably connected to that mounting ear is a second elongate screw, also not shown. Axial movement of the second screw in one direction will adjust the beam of the headlight vertically in one direction and axial movement of the screw in the opposite direction adjusts the beam in the opposite vertical direction.

Figure 4:
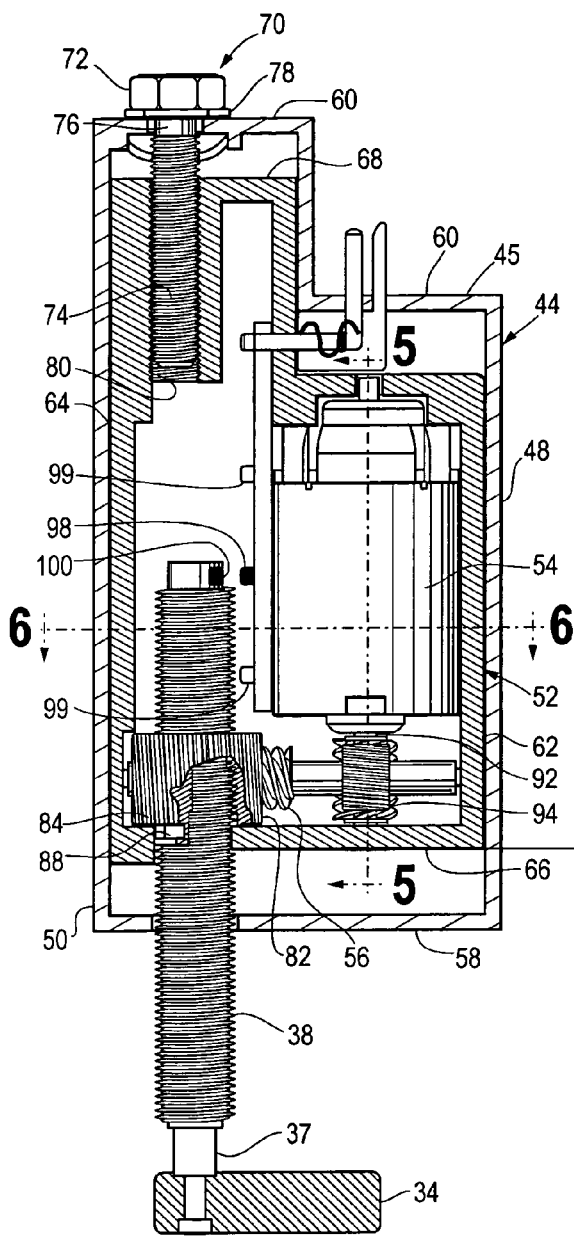
FIG. 4 is a greatly enlarged cross-sectional view of the motorized drive assembly shown in FIG. 2.
Figure 5:
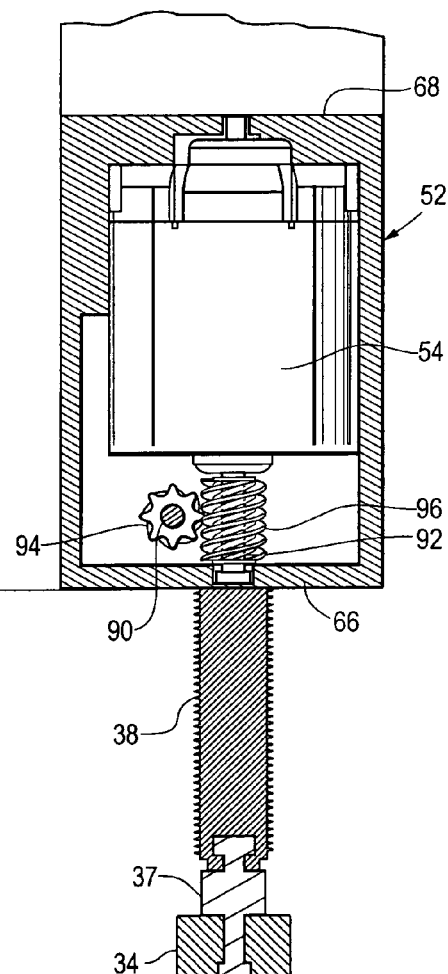
FIG. 5 is a cross-sectional view of the motorized drive assembly shown in FIG. 4 taken through line 5-5 thereof.

Referring to FIGS. 2, 3 and 4, a motorized drive assembly 44 is positioned behind the second mounting position 25 and connected to a portion of the vehicle body 11 by bolts 40 and adapted to receive the second end of the screw 38 for motorizing the adjustment of the headlight 18 in a horizontal plane. A second motorized drive assembly 47 (visible in FIG. 3 only) is positioned behind the third mounting position 26 for adjusting the beam of the headlight 18 in a vertical plane. Although the elements of the motorized drive assembly 49 behind mounting position 26 are not depicted, they are identical to the drive assembly 44 and the description of assembly 44 is therefore applicable to both assembly 44 and 47.

The drive assembly 44 includes a generally tubular retainer 45 having spaced apart parallel long sides 48, 50 that extend generally parallel to the axis 35 of the headlight and therefore parallel to the longitudinal axis of the vehicle. Slideable within the retainer 45 is a housing 52 for retaining an electric motor 54 and a worn gear 56 as are further described below. Positioned at the end of the retainer 45 nearest the headlight 18 is a plate 58 oriented perpendicular to the long walls 48, 50 so as to retain the housing 52 from sliding out of that end of the retainer 45.

The vehicle to which the headlight 18 is mounted has forward and rearward ends and the headlight 18 is at the forward end of the vehicle. Since the housing 52 is slideable within the retainer 45 in a direction parallel to the length of the vehicle, the end 58 of retainer 45 and the ends of all other parts aligned parallel to the axis 35 that are nearest the headlight 18 shall be considered to be the forward ends thereof and the ends furthest from the headlight 18 shall be considered the rearward ends thereof. Similarly, the housing 52 and other parts moveable parallel to the axis 35 will be considered as moving forwardly when moving toward the headlight 18 and moving rearwardly when moving away from the headlight 18. The plate 58 is therefore mounted at the forward end of the retainer 45. The retainer 45 further has a rear wall 60 that extends across the rearward end thereof.

The housing 52 has elongate parallel outer sidewalls 62, 64 and forward and rearward end walls 66, 68 respectively. The outer surfaces of the sidewalls 62, 64 are spaced apart a distance that is a little less than the space between the parallel inner surfaces of the long sides 48, 50 of the retainer 45 such that the housing 52 is slideable with respect to the retainer 45.

The distance between the end walls 66, 68 of the housing 52 are less than the distance between the plate 58 and the rear wall 60 of the retainer 46 such that the housing is slideable between a first position, where the forward wall 66 of the housing 52 abuts the forward end plate 58 of the retainer, to a second position, where the rear wall 68 of the housing 52 abuts the rear wall 60 of the retainer 45. As depicted in FIGS. 2 and 4, the housing 52 is midway between the first and second positions within the retainer 45.

The position of the housing 52 with respect to the retainer 45 is axially adjusted by means of a set screw 70 having a hex head 72, a threaded shank 74, and a reduced diameter neck section 76 between the head 72 and the shank 74. A retainer 78, of the type known in the art, rotatably retains the neck 76 of the set screw 70 against axial movement with respect to the retainer 52. The threaded shank 74 of the set screw 70 is received in a threaded bore 80 in the housing 52 such that the manual rotation of the set screw 70 by the use of a screw driver, not shown, axially adjusts the position of the housing 52 with respect to the retainer 45.

Figure 6:
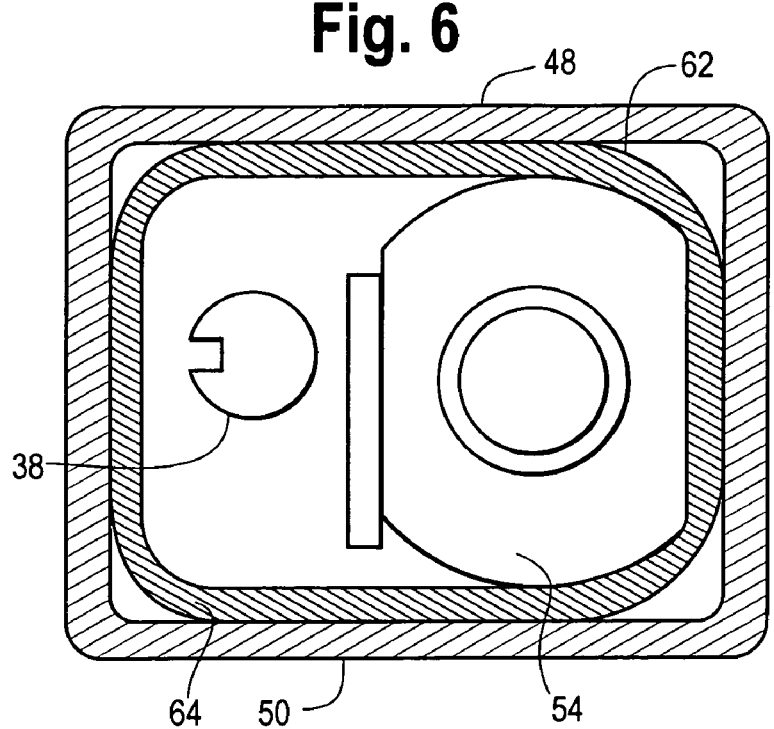
FIG. 6 is a cross-sectional view of the motorized drive assembly shown in FIG. 4 taken through line 6-6 thereof.

As best seen in FIG. 6, the parallel long sides 48, 50 of the tubular retainer 46 are generally planar as are the sidewalls 62, 64 of the housing 52. As seen in cross-section, the inner spaced defined by the walls 48, 50 of the retainer 45, and the cross-sectional configuration of the housing 52 is defined by the side walls 62, 64, are both non-circular such that the housing 52 is non-rotatable with respect to the retainer 45.

Figure 7:
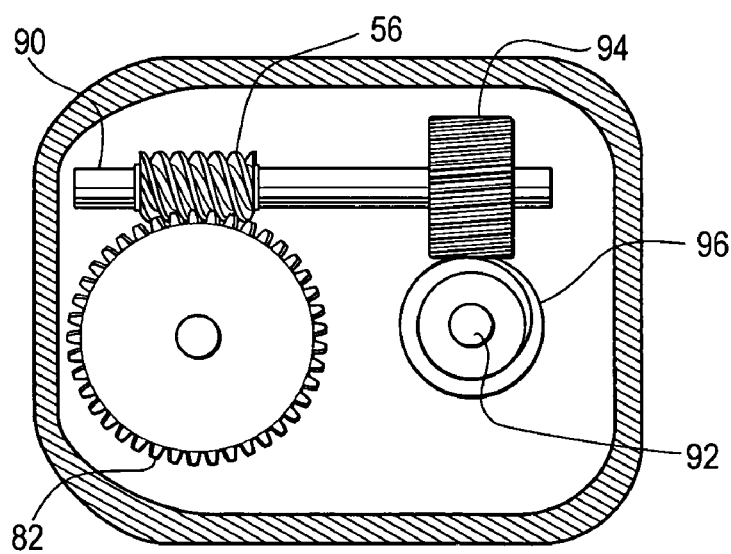
FIG. 7 is another cross-sectional view of the motorized drive assembly shown in FIG. 4 taken through line 7-7 of FIG. 5.

Referring to FIGS. 2, 4, and 7, the threaded screw 38 extends through an opening in the forward end wall 66 of the housing 52 and received within interior threads of a drive gear 82. The drive gear 82 has outer teeth that engage the primary worm gear 56. Extending from the forward end of the drive gear 82 is a tubular portion 84 that extends through a bearing, not shown, fitted in the forward end 66 of the housing 52. An annular flange 88 around the distal end of the tubular portion 84 engages a complementary annular portion of end surface 66 to rotatably retain the drive gear 82 within the forward end 66 of the housing 52. Since the screw 38 is non-rotatably attached to the ear 34 on the headlight housing 22, the rotation of the drive gear 82 in one direction causes the screw 38 to be axially moved outwardly of the housing, or in a forward direction and rotation of the drive gear 82 in the opposite direction causes axial inward or rearward movement of the screw 38.

It should be appreciated that the forward surface 66 of the housing 52 is oriented perpendicular to the axis 35 of the headlight and perpendicular to the longitudinal surfaces 48, 50 of the retainer 45 and perpendicular to the long side walls 62, 64 of the housing 52. Accordingly, the screw 38 is axially moveable within the housing 52 and within the retainer 45 and axially moveable in a forwardly and rearwardly direction that is generally parallel to the axis 35 of the headlight.

The primary worm gear 56 is positioned on a shaft 90 oriented perpendicular to the axis of the screw 38 and perpendicular to the axis of the drive shaft 92 of the motor 54. In addition to the worm gear 56, the shaft 90 has a second gear 94 mounted thereon that engages a second worm gear 96 mounted on the end of the drive shaft of the motor 54. Accordingly, rotation of the drive shaft 92 of the motor 54 rotates the second worm gear 96 which in turn rotates the second gear 94. Since the second gear 94 and the primary worm gear 56 are locked for rotation with the shaft 90, rotation of the second gear 94 causes rotation of the primary worm gear 56 which in turn causes rotation of the drive gear 82. Therefore, rotation of the motor 54 in one direction will cause the axial forward movement of the screw 38, and rotation of the motor 54 in the opposite direction will cause axial rearward movement of the screw 38.

Figure 8:
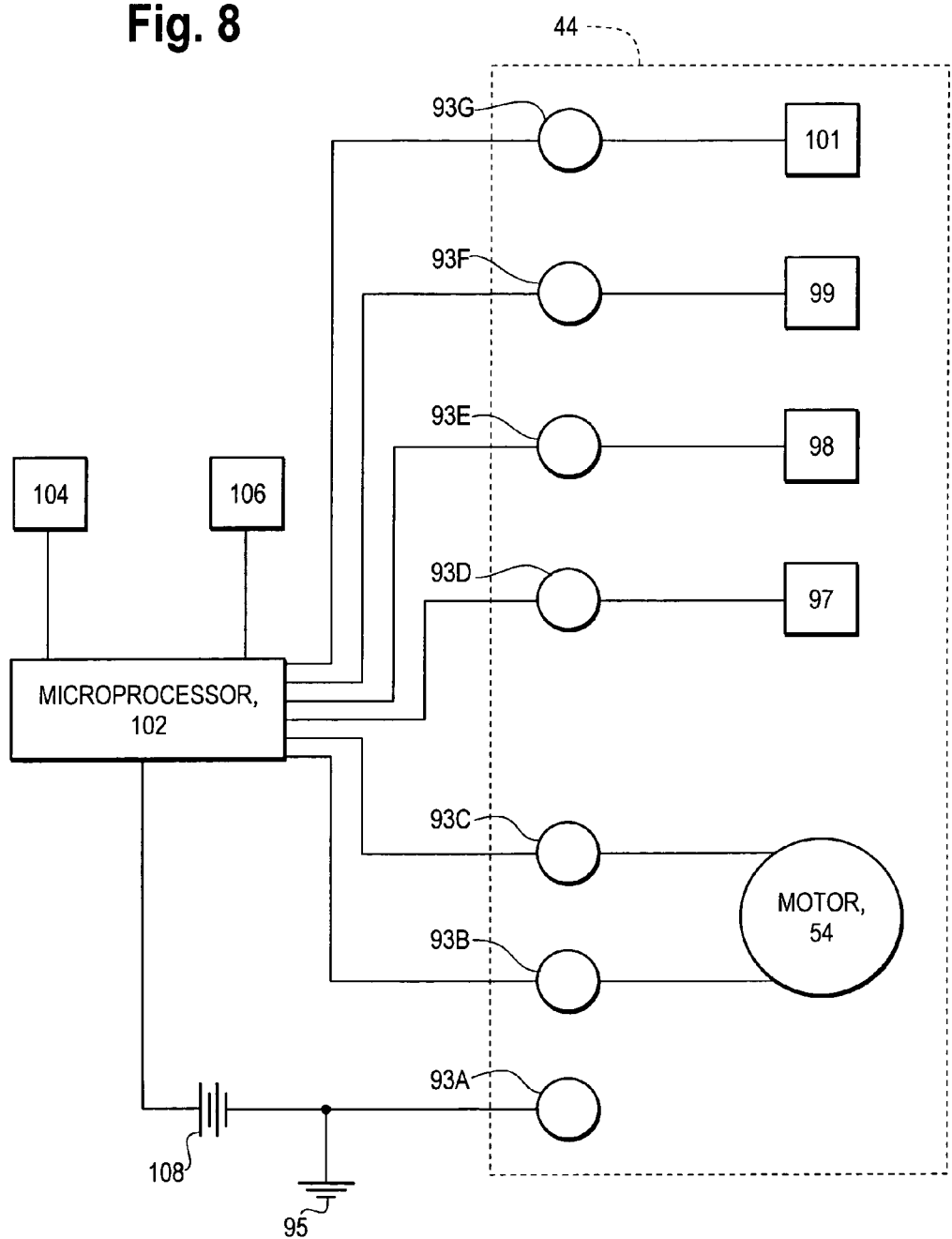
FIG. 8 is a block diagram of the circuit for operating the device shown in FIG. 2.

Referring to FIGS. 4 and 8, extending through the rearward end 60 of the retainer 45 are a plurality of electrical connectors 93A, 93B, . . . 93G. Connector 93A is connected to the ground 95 of all the electric components of the assembly 44. Connectors 93B and 93C are connected to the motor 54, one connector 93B to rotate the motor in one direction, and the other connector 93C to rotate it in the opposite direction. Connectors 93D, 93E and 93F are connected to Hall effect detectors 97, 98, 989 respectively, and connector 93G is connected to a detector 101 for sensing the completion of each rotation of the drive gear 82.

Referring again to FIGS. 2, 4, and 7, to adjust the orientation of a beam from the headlight 18 through one plane, the screw 38 is axially moveable from a position in which the screw 38 is nearly entirely withdrawn in the housing 52 to a second position in which the greater part of the length of the screw 38 extends outward or forward of the forward surface 66 of the housing 52. In accordance with the present invention, detectors, not shown, are provided within the housing 52 to detect the relative axial position of the screw 38 with respect to the housing 52.

Referring further to FIG. 4, a magnet 100 is positioned at the distal end of the screw 38 within the housing 52, and three Hall effect sensors 97, 98, 99 are mounted on the housing adjacent the path of the distal end of screw 38 as it moves axially inwardly and outwardly of the housing 52. Hall effect sensor 97 is located at a position where it will be opposite the magnet 100 when the screw 38 is fully withdrawn to the maximum permissible amount, within the housing 52. At the other extreme, Hall effect sensor 99 is positioned so as to be opposite the magnet 100 when the maximum length of the screw 38 is outward of the housing 52, and the Hall effect sensor 98 is positioned at a point midway between sensors 97 and 99.

As shown in FIG. 8, the electric motor 54 is connected through the connectors 93A . . . 93G to a microprocessor 102 which receives input from the three Hall effect sensor 97, 98, 99 and from other sensors 104, 106 in the vehicle such as sensors in the steering mechanism, not shown, or in the shock absorbers, not shown, of the suspension system of the vehicle.

The microprocessor 102, the headlight 18, and all the electronics related to the motorized drive assembly 44 are powered by the vehicle battery 108. The microprocessor 102 is configured to receive information from the sensors 104, 106 and direct power to the motor 54 when a change in the direction of the beam of the headlight 18 is needed. The input from the Hall effect sensors 97, 98, 99 and sensor 101 enable the microprocessor 102 to control the rotation of the motor and bring about the desired change in the orientation of the beam from the headlight 18.

When the microprocessor 102 determines from the sensors 104, 106 that conditions exist that require a change in the orientation of the beam of the headlight 18, it causes the motor 54 to rotate in the desired direction by applying power to the appropriate contact 93B or 93C. The microprocessor 102 continues to apply power to the motor 54 until the gear 82 has been caused to rotate through the number of turns needed to undertake the desired change in the direction of the headlight beam, after which power to the motor 54 is terminated.

For example, when the vehicle enters a turn and sensor 104 detects that the steering wheel has been rotated beyond a certain point, the motor 54 that controls the horizontal orientation of the beam will be energized by the microprocessor 102 to change the axial orientation of the screw 38 that effects the horizontal aiming of the headlight 18. The motor 54 is energized to rotate the drive gear 82 for the second mounting position 25 to rotate it in the desired direction and for a predetermined desired number of rotations to effectuate the desired horizontal change in the aim of the headlight 18, thereby directing the beam into the oncoming turn. In similar fashion, when there is a change in the vehicle orientation, caused by the uneven application of loads to the trunk or otherwise, or by climbing up or moving downwardly of a hill that requires a change in the vertical orientation of the headlight 18, the microprocessor 102 will respond to sensor 106 indicating that the orientation of the vehicle has changed and will energize the motor 54 in the second drive assembly 47.

The Hall effect sensors 97, 98, 99 provide useful information to the microprocessor 102. The inner end sensor 97 enables the microprocessor 102 to stop the motor 54 from trying to withdraw the screw 38 beyond its fully withdrawn position and the outer end sensor 99 enables the microprocessor 102 to stop the motor 52 from trying to extend the screw 38 beyond its fully extended position. The midpoint sensor 98 is triggered every time the screw 38 passes or stops at the midpoint in its path of travel. Preferably, the microprocessor 102 is programmed so that the drive assembly 44 is in its at rest condition when the midpoint sensor 98 is being activated. The midpoint sensor 98 also provides a measuring point from which to begin counting the number of turns of the gear 82, as sensed by the sensor 101, where a predetermined number of turns are needed to cause a desired change in the orientation of the beam of the headlight 18.

When the vehicle is at rest and the detectors 104, 106 in the vehicle determine that the vehicle is level and the front wheels are directed so as not to turn the vehicle, the assemblies 44, 47 will be in an at-rest orientation with the magnet 100 adjacent the midpoint sensor 98. With this system in this condition, the set screws 70 for the drive assemblies 44 and 47 are adjusted so that the beam from the headlight 18 will illuminate a roadway which proceeds ahead of the vehicle with neither a turn nor a hill, and the vehicle is level while sitting on the road. With the set screws 70 so oriented, the detectors 104, 106 in the vehicle will detect changes in the rotation of the steering wheel or tilting of the vehicle frame and cause the appropriate motors 54 to make compensating adjustments so that the beams from the headlights will continue to be aimed in the most desirable orientation with respect to the roadway ahead.

Figure 9:
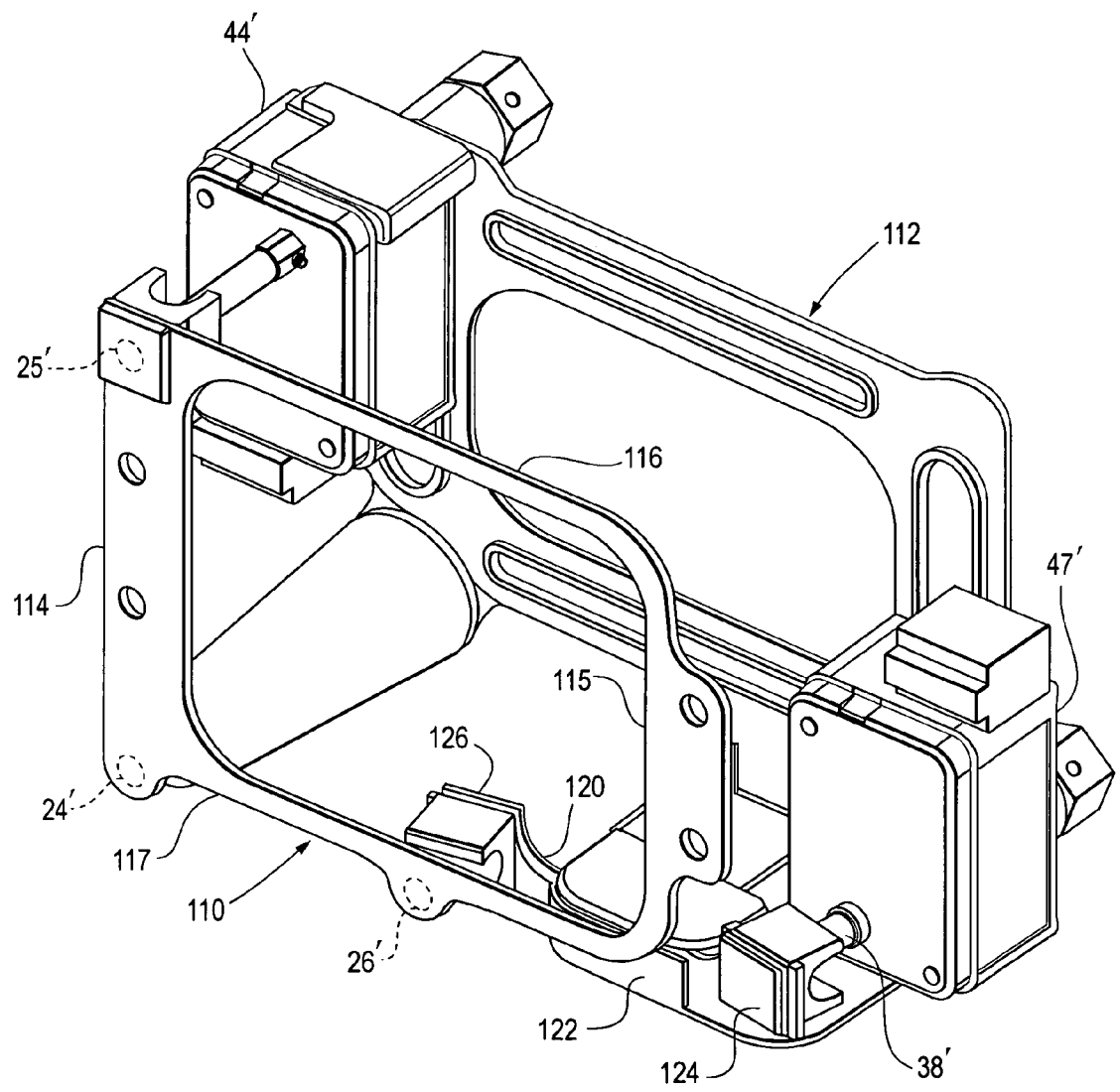
FIG. 9 is an isometric view of a frame for retaining a headlight, the frame mounted to a vehicle frame by a pivot and a pair of motorized drive assemblies in accordance with the present invention.

Referring to FIG. 9, as previously stated, a headlight (not shown) may be mounted in a retaining frame 110 having a central opening with a plurality of suitable retainers, not shown, positioned around the central opening for retaining the headlight therein. In this case, the mounting portions, 24', 25', and 26' attach to the frame 110 rather than directly to the headlight. As depicted in this embodiment, a ball joint or the equivalent is located at the first position 24' and motorized drive assemblies 44' and 47' are mounted on the vehicle frame 112. Axially moveable screws 38 extend from each of the motorized drive assemblies 44', 47' and the outer ends of the screws 38 are connected by flexible connectors, such as previously described, to the remaining two mounting positions 25', 26'.

It is desirable to minimize the size of the motorized drive assemblies 44', 47'. A consequence of minimizing the size of the assemblies 44', 47' is to limit the range of movement of the axially moveable screws 38. On the other hand, it is desirable that the motorized assembly that turns the beam of the light through a horizontal arc be capable of turning sufficiently far to illuminate the road ahead even when the vehicle is undertaking a turn of the smallest possible radius, in either the left direction or the right direction. To accommodate the lighting requirements encountered during the normal use of a vehicle, the headlight should be turnable through a greater horizontal arc than is required of the vertical arc. On the other hand, many automobile headlights are configured as a rectangle and therefore the retainer 110 has a generally rectangular configuration with vertically oriented side bars 114, 115 and horizontal bars 116, 117 that connect the ends of the horizontal bars 114, 115 with the horizontal bars 116, 117 being longer than the vertical bars 114, 115.

To maximize the angle through which the beam of a headlight is horizontally moveable, attachment position 26' is located midway along the length of the lower horizontal bar 117 of the frame 110. By positioning attachment position 26' near the pivot 25', a shorter axial stroke is needed by the screw 38 to cause a given turning of the headlight. In the embodiment depicted, a pivot arm 120 is mounted to a portion 122 of the vehicle frame 112 with one end 124 of the pivot arm 120 pivotally connected to the axially extendable screw 38 extending from the motorized assembly 47' and the other end 126 of the pivot arm 120 is pivotally connected by a suitable pivot to attachment position 26'.

Figure 10:
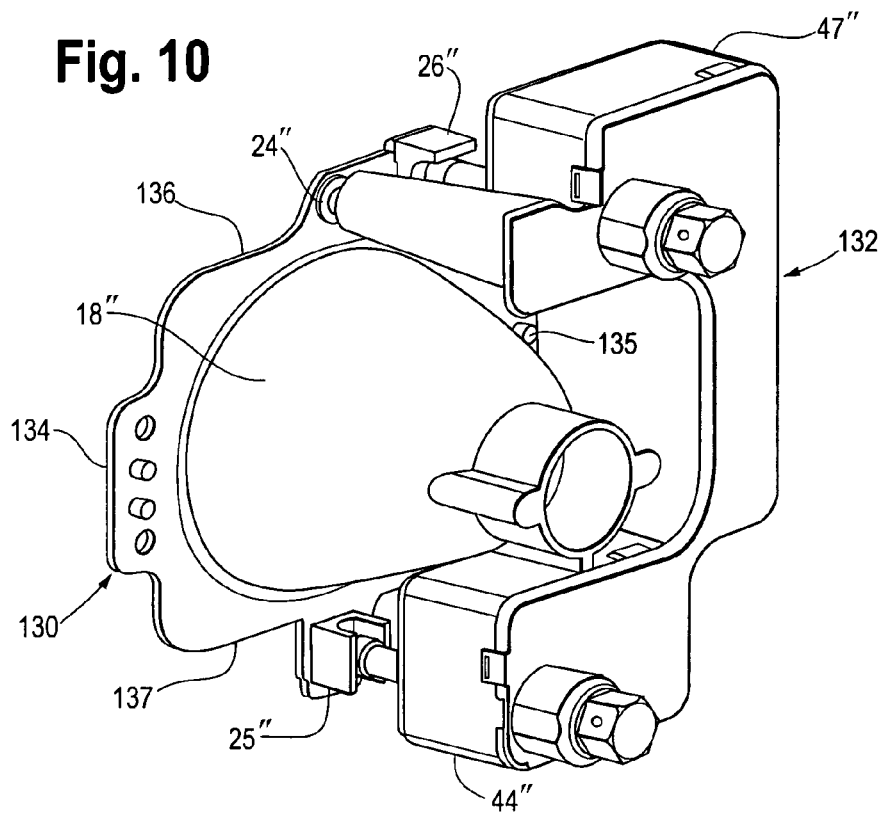
FIG. 10 is another configuration of a frame for retaining a headlight mounted to a vehicle frame in accordance with the present invention.
Figure 11:
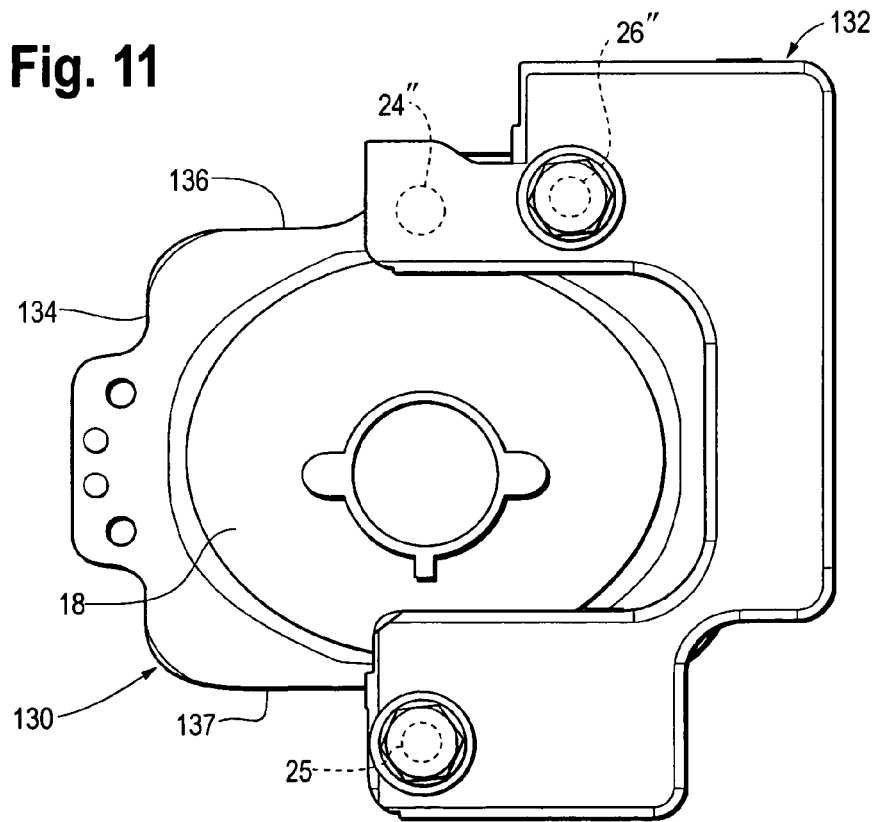
FIG. 11 is a rear view of the frame and the motorized drive assemblies shown in FIG. 10.

Referring to FIGS. 10 and 11, in an alternate embodiment, a headlight frame 130 for retaining a headlight 18" is attached to the frame 132 of a vehicle at attachment points 24", 25", and 26", where attachment point 24" is a pivot joint and motorized drive assemblies 44", 47" are positioned behind attachment points 25" and 26" respectively. In this embodiment, the headlight 18" is depicted as having a generally oval configuration, although the frame 130 nonetheless has a generally rectangular configuration including vertical side portions 134, 135 and horizontal upper and lower portions 136, 137. In this embodiment, the pivot mounting position 24" is located midway along the upper horizontal portion 136 and the vertical orientation motorized drive assembly 44" is positioned midway along the lower horizontal portion 137. The horizontal motorized drive assembly 47" is positioned along the upper portion 136 of the frame 130 and spaced a short distance from the pivot joint 24". With this configuration of mounting points 24", 25", 26", the horizontal arc through which the headlight beam 18" is maximized while the physical size of the drive assemblies 44", 47" are minimized.

Although the present invention has been described with respect to a single embodiment, it will appreciated that many modifications and variations can be made without departing from the true spirit and scope of the invention. It is therefore the intent of the appended claims to cover all such modifications and variations that fall within the spirit and scope of the invention.

What is claimed:

1. An assembly for motorizing the positioning of a headlight with respect to a vehicle body wherein said headlight has three mounting locations around a circumference thereof including a first adjustment at a first location for adjusting a beam of said headlight in a first plane, a second adjustment at a second location for adjusting said beam in a second plane, and a third location spaced from said first and second location, said assembly comprising a retainer attached to said vehicle body behind said first location, said retainer having a plurality of parallel spaced apart side members, a housing having parallel outer walls spaced apart a distance less than a spacing between said side members of said retainer, said housing in said retainer with said outer walls between said side members of said retainer wherein said housing is longitudinally moveable in said retainer toward and away from said first location, a manual adjustment for adjustably fixing a position of said linearly moveable housing with respect to said retainer, an elongate member having a first end and a second end, said first end attached to said headlight at said first location, said second end extending into said housing, a reversible motor, a drive assembly drivingly connecting said reversible motor to said elongate member for axially moving said elongate member with respect to said housing and thereby adjusting said beam of said headlight in a first plane, and said motor and said drive assembly being within said housing and moveable therewith upon operation of said manual adjustment.

2. The assembly of claim 1 and further comprising a magnet on one of said elongate member and said housing, a magnetic detector on the other of said elongate member and said housing for detecting a position of said elongate member relative to said housing.

3. The assembly of claim 2 wherein said detector detects when said elongate member is at one end of a length of travel.

4. The assembly of claim 2 wherein said detector detects when said elongate member is at a midpoint of a length of travel.

5. The assembly of claim 1 wherein said elongate member is a threaded screw.

6. The assembly of claim 5 wherein said threaded screw is locked against rotation and said assembly further comprises a rotatable gear engaged with said motor, said rotatable gear having a threaded central opening threadedly engaging said threaded screw, and said rotatable gear further having surface engaged with a surface on said housing for preventing axial movement of said rotatable gear.

7. The assembly of claim 1 wherein said elongate member includes a flexible connector between said shaft and said headlight.

8. The assembly of claim 7 wherein said flexible connector is made of neoprene.

* * * * *